Sept. 13, 1932.  M. FERRANTE  1,876,889
GAS METER CONSTRUCTION
Filed Sept. 8, 1930
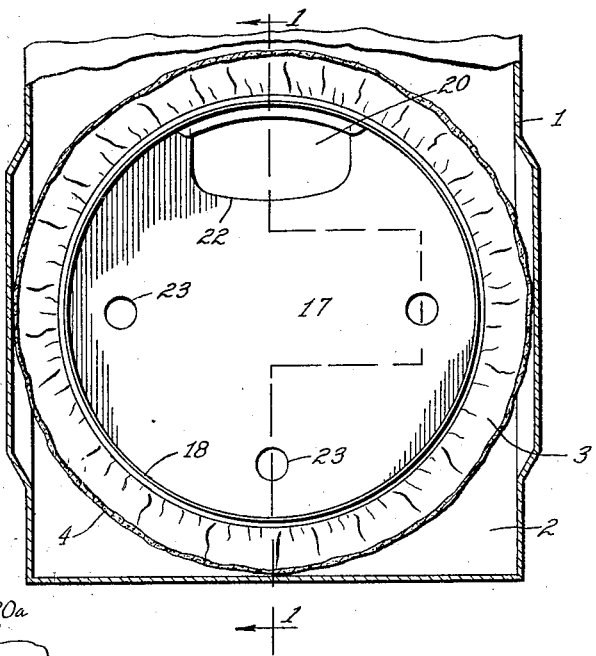
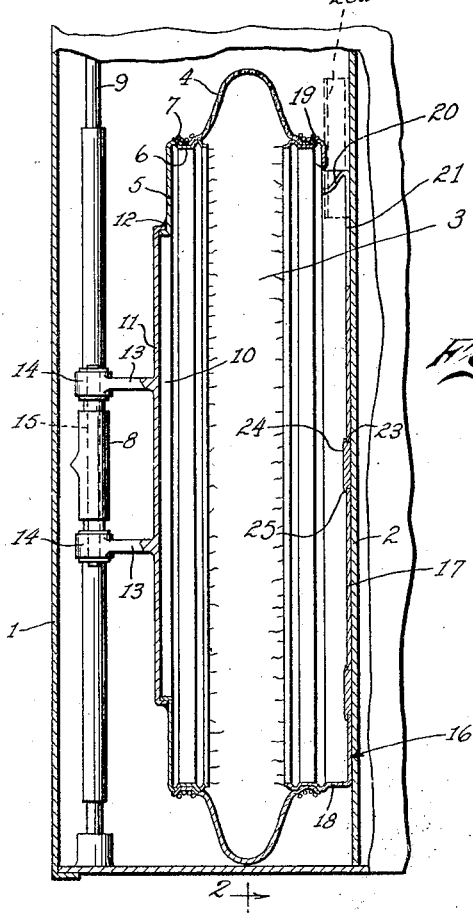
Inventor
Michael Ferrante;
By Lyon & Lyon
Attorneys Patented Sept. 13, 1932

1,876,889

UNITED STATES PATENT OFFICE

MICHAEL FERRANTE, OF LOS ANGELES, CALIFORNIA, ASSIGNOR OF ONE-HALF TO SOUTHERN CALIFORNIA GAS COMPANY, OF LOS ANGELES, CALIFORNIA, A CORPORATION OF CALIFORNIA

GAS METER CONSTRUCTION

Application filed September 8, 1930. Serial No. 480,326.

This invention relates to the construction of meters, and while features of the invention may be applied to meters used for any purpose, the invention is intended to be especially useful in connection with the repairing of gas meters.

Gas meters of a common type include in their construction a bellows having a flexible "cylindrical" wall connecting two heads, one of which moves toward and from the opposite head, thereby drawing the fluid such as gas to be measured into the interior of the bellows, and on the opposite movement expelling a portion of the fluid from the bellows.

Heretofore it has been the general practice to employ tanned leather for the flexible wall of the bellows, the edges of which were secured to metal rings, and these metal rings were then soldered to the heads. In some cases the inner head was in the form of a permanent wall of the casing of the meter and the ring carrying the edge of the flexible apron and having a notch in its edge at the admission point for the gas, would be soldered to this fixed wall. This necessitated considerable soldering and involved soldering the entire circumference of the ring, as well as around the notch, and frequently resulted in burning the leather from the heat of the iron. This sometimes happens by transmitting heat through the ring to the leather on its outer side.

The general object of this invention is to overcome these difficulties and to provide a simple meter construction which will avoid the necessity for a great amount of soldering and which will do away with the necessity of employing the rings.

In repairing meters using rings, it was the practice to substitute a new bellows assembly with its metal rings and unsolder the old rings, and before installing the assembly it would be necessary to retin the fixed wall on the circumferential soldering line. If the fixed head had become rusty this would be very difficult. One of my objects is to overcome these difficulties.

Further objects of the invention will appear hereinafter.

The invention consists in the novel parts and combinations of parts to be described hereinafter, all of which contribute to produce an efficient gas meter construction.

A preferred embodiment of the invention is described in the following specification, while the broad scope of the invention is pointed out in the appended claims.

In the drawing:

Figure 1 is a vertical section taken through a portion of the casing of a gas meter embodying my invention and illustrating the construction and arrangement of the parts associated with the bellows, certain parts being broken away. This section is taken about on the line 1—1 of Figure 2.

Figure 2 is a section taken about on the line 2—2 of Figure 1 and further illustrating the invention.

The type of gas meter to which my invention has been applied is one in which a fixed head is supported on a fixed wall of the meter and opposite to this head a floating head is provided connected to the fixed head by means of a bellows wall or flexible apron which enables the floating head to approach and recede from the fixed head. The number of movements of this floating head are counted at an indicator which gives the reading of the meter.

Referring more particularly to the parts, 1 represents a gas meter casing having a relatively fixed wall 2 which may be a partition wall as indicated. The bellows which constitutes a measuring chamber 3 for the fluid, such as gas, comprises a flexible wall 4, usually formed of tanned leather.

The bellows includes a floating head 5 in the form of a disc with an integral flange 6 at one edge to which one edge of the apron 4 is secured preferably by windings of catgut 7. This head 5 is connected to an arm 8 that extends out from a shaft 9 and as the bellows fills and empties, this arm 8 is moved back and forth, thereby rocking the shaft 9. The rocking movements of the shaft 9 are counted so as to give an indication of the amount of gas measured by the meter.

In order to give access to the interior of the meter, the floating head 5 is preferably provided with a central opening 10 provided with a removable cap 11, the flange of which fits down over a corresponding flange at the edge of the opening, at which point solder 12 may be provided to make a gas-tight connection. The cap 11 may be attached to the end of the arm 8 by means of integral posts 13 with bearings 14 on their ends receiving the ends of a pin 15 that passes through the free end of the arm 8.

In constructing the opposite side of the bellows, I provide a relatively fixed head 16 which is in the form of a disc 17 having a marginal flange 18 integral with the disc, and similar to the flange 6 already described, for enabling the edge of the apron 4 to be attached by catgut windings 19 or in any other suitable manner. If desired, a string may be used instead of catgut.

At one point in its periphery the flange 18 is provided with an opening 20 for attachment of a duct indicated by the dotted lines 20a for admitting the fluid to be measured. This opening 20 not only extends through the flange, but preferably extends into the material of the disc as indicated at 21 at which point a relatively deep U-shaped throat or opening is formed as indicated by the line 22 in Figure 2. In addition to this I also provide the disc 17 at a plurality of points with openings such as the openings 23 (see Fig. 2). These openings may be punched by a punch press in the plate out of which fixed head 16 is formed.

In constructing the meter, the bellows may be formed before attaching it to the fixed wall 2 of the meter, leaving off, however, the cap 11. The bellows is then set in place with the opening 20 fitted to the duct or spout 21 which may be soldered on the inner side of the bellows or otherwise treated to effect a gas-tight connection.

Through the opening 10 solder 24 is applied in the openings 23. This solder 24 should be applied liberally so as to form more or less of a head 25 on the solder projecting over the edge of the opening. In this way the solder will hold the fixed head securely to the fixed wall 2. The fact that these openings are spaced apart increases the secureness of the soldered head 16. After attaching the fixed head in this way the repair man should place the cap 11 on the opening 10 and solder it by applying solder 12 as indicated.

It should be understood that the aprons 4 of such bellows must be repaired from time to time and in order to do this properly, it is necessary to remove the bellows from the gas meter. If this invention is practiced, this can be readily accomplished repeatedly by breaking the fixed head 16 away from the fixed wall 2 at the soldered points 24 and after effecting the repair reattaching the fixed head in place as described above.

What I claim is:

1. In a meter construction, the combination of a casing, a measuring chamber within the casing having a bellows including a flexible apron and a movable head connected to said apron, a fixed wall within the casing opposite the said movable head, and said bellows also including a relatively fixed head in the form of a disc with a flange projecting toward the movable head for attaching the flexible apron of the bellows, said disc having spaced openings therethrough for the application of solder on the side of the fixed head remote from said fixed wall.

2. In a meter construction, the combination of a casing, a measuring chamber within the casing having a bellows including a flexible apron and a movable head connected to said apron, a fixed wall within the casing opposite the said movable head, and said bellows including a relatively fixed head in the form of a disc with a flange projecting toward the movable head for attaching the flexible apron of the bellows, said disc having spaced openings therethrough for the application of solder on the side of the fixed head remote from said fixed wall, the said movable head having an opening through which the said solder may be applied, and a removable cap for said last opening.

3. In a meter construction, a measuring chamber having a bellows including a flexible apron with a floating head connected to said apron, a fixed wall opposite the floating head, said bellows including a fixed head to be attached to said fixed wall, said fixed head being in the form of a disc with a flange projecting toward the floating head for attaching the flexible apron of the bellows, said disc having spaced openings therethrough for the application of solder on the inner side of the fixed head.

4. In a meter construction, the combination of a casing with a fixed wall, a measuring chamber within the casing having a bellows with a flexible apron, a floating head connected to said apron, and a fixed head opposite the floating head to be attached to said fixed wall of the casing, said fixed head being in the form of a disc with a flange projecting toward the floating head for attaching the flexible apron of the bellows, said disc having spaced openings therethrough for the application of solder on the inner side of the fixed head, and said flange having an opening therethrough for connection to a duct for delivering the fluid to be measured, into the bellows.

5. A meter construction as described in claim 4 in which the opening through the flange extends into the disc of the relatively fixed head.

Signed at Los Angeles, California this 2nd day of September, 1930.

MICHAEL FERRANTE.